UNITED STATES PATENT OFFICE.

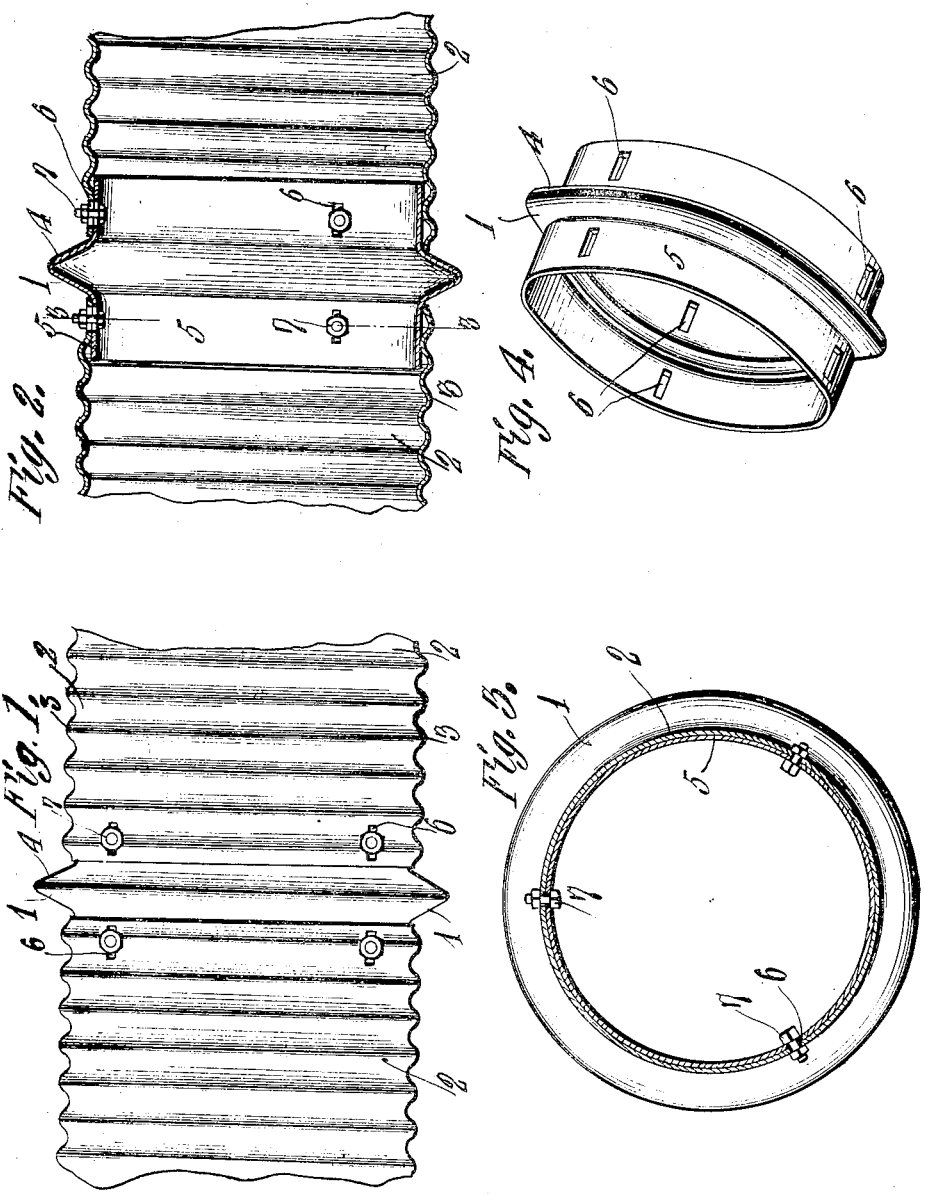

JAMES DOYLE, OF MADISON, WISCONSIN.

FLEXIBLE JOINT FOR CULVERTS.

No. 931,581.　　　　　Specification of Letters Patent.　　Patented Aug. 17, 1909.

Application filed February 3, 1909. Serial No. 475,832.

*To all whom it may concern:*

Be it known that I, JAMES DOYLE, a citizen of the United States, residing at Madison, in the county of Dane and State of Wisconsin, have invented certain new and useful Improvements in Flexible Joints for Culverts, of which the following is a specification, reference being had to the accompanying drawings.

This invention relates to improvements in flexible joints for culverts, sewer pipes and the like.

The object of the invention is to provide a simple and practical joint or connection for the sections of a tubular culvert or pipe, whereby such sections may be flexibly or yieldably connected to prevent the culvert or pipe from breaking when the filling around the same has been washed away and a heavy load or strain is placed upon the same.

With the above and other objects in view, the invention consists of the novel features of construction and the combination and arrangement of parts hereinafter fully described and claimed, and illustrated in the accompanying drawings, in which—

Figure 1 is a side elevation of a portion of a tubular culvert or pipe constructed in accordance with the invention; Fig. 2 is a detail longitudinal section through the same; Fig. 3 is a transverse section; and Fig. 4 is a detail perspective view of one of the connecting bands or joint sections.

In the drawings 1 denotes the improved connecting bands or joint sections of a tubular culvert, pipe or the like composed of a plurality of sections 2. As illustrated, the latter are constructed of sheet metal and are of cylindrical shape with transverse annular corrugations 3, but it will be understood that they may be of other form and construction. Each of the connecting sections or bands 1 is also preferably formed from a single piece of sheet metal bent into circular or cylindrical form with its ends suitably united and having its central portions stamped or shaped to form an annular outwardly projecting corrugation 4 which is preferably V-shaped in cross section and which is of greater depth and size than the corrugations 3 in the pipe or culvert sections 2. The ends of the sections 1 form longitudinally projecting annular flanges 5 which are adapted to fit within the ends of the section 2 and to have a limited longitudinal sliding movement therein, whereby the joint is made flexible or yielding to such an extent that it will give under severe strain. This limited slidable connection between the flanges 5 and the ends of the culvert or pipe sections 2 is preferably effected by forming in the overlapping portions of said parts longitudinally extending slots 6 which register with each other and receive bolts, rivets or similar pins 7. It will be understood that any number of these slot and pin connections may be provided around the joint and that the slots or openings 6 may be made longer or shorter according to the amount of flexibility it is desired to give the joint. The peculiar shape of the corrugation or rib 4 adds strength to the joint and the size and shape of the same also tend to retain the filling in which the culvert is embedded, around the same. Should, however, such filling wash away the flexibility of the joint will prevent damage to the same when it is under a heavy load or strain.

Having thus described the invention what is claimed is:

1. A culvert comprising sections, a joint section arranged between the first mentioned sections and having portions to overlap the same and means arranged in said overlapping portions of the sections to prevent them from separating and to permit them to have limited longitudinal sliding movement upon each other.

2. A culvert comprising sections and a joint section having portions to overlap the first mentioned section, said overlapping portions of the sections having slot and pin connections, whereby the joint is made flexible.

3. A culvert comprising tubular sections, a joint section arranged between the tubular sections and having at its ends flanges to overlap said tubular sections, the central portion of said joint section being formed with an annular outwardly projecting corrugation, said overlapping portions of the tubular and joint sections having slot and pin connections, whereby the joint is rendered flexible.

4. A culvert comprising tubular sections, a joint section arranged between the tubular sections and having at its ends flanges to overlap said tubular sections, the central portion of said joint section being formed with an annular outwardly projecting corrugation, the overlapping portions of the tubular and joint sections being slidably engaged, and means for limiting the sliding movement of said overlapping portions upon each other.

In testimony whereof I hereunto affix my signature in the presence of two witnesses.

JAMES DOYLE.

Witnesses:
A. C. RUNKEL,
ALMA STEINER.